June 19, 1962 I. R. BARR 3,039,405
VISION BLOCK MOUNTING
Original Filed March 15, 1957
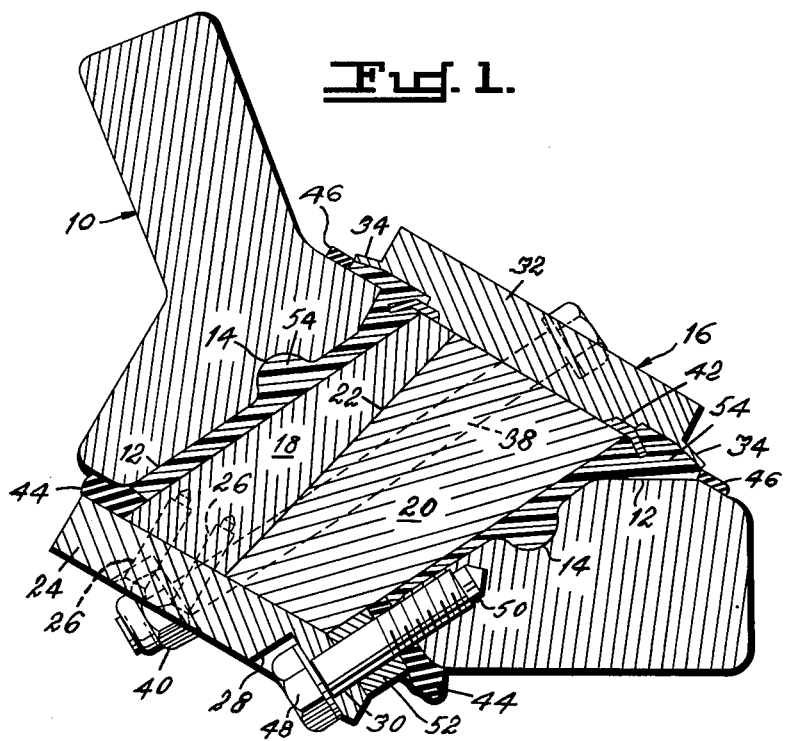
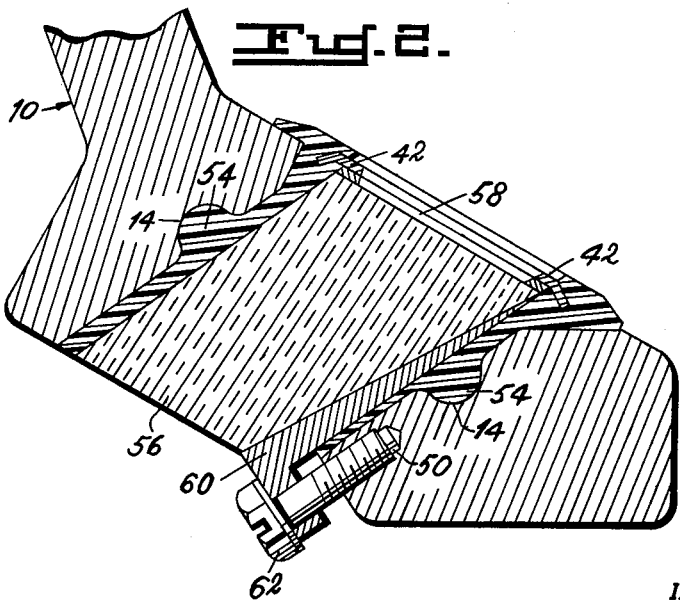
INVENTOR.
Irwin R. Barr

United States Patent Office 3,039,405
Patented June 19, 1962

3,039,405
VISION BLOCK MOUNTING
Irwin R. Barr, Kingsville, Md., assignor to the United States of America as represented by the Secretary of the Army
Original application Mar. 15, 1957, Ser. No. 646,506, now Patent No. 2,974,407, dated Mar. 14, 1961. Divided and this application May 10, 1960, Ser. No. 35,860
4 Claims. (Cl. 109—58.5)

The invention relates to a vision block mountings in castings and particularly in armored cupolas as used with military vehicles.

This application is a division of my original application Serial No. 646,506 filed March 15, 1957, now issued as U.S. Patent No. 2,974,407 dated March 14, 1961, for Method of Vision Block Installation.

In the manufacture of large metal castings the molds are made of sand, and cores are used to provide voids in the castings. Since the core is usually made of a sand, the finish of holes and orifices in the casting will naturally be of a rough texture, and the holes will be only approximately the desired size. When it is desired that such core-formed holes act as mating surfaces or supporting members for other elements, the holes must be finished to present accurate and smooth surfaces, and it is to this operation that the invention is directed.

The most common method of finishing castings is to place the casting in a machine tool and machine all surfaces which require accurate finishes. This method is satisfactory in those cases where the castings are of moderate size and weight so as to be accommodated by conventional machine tools. However, where the casting is large and heavy, special machinery must be employed to perform machining operations thereby increases manufacturing costs and necessitating time-consuming set-up and handling procedures.

The above problem is encountered in the machining of cupolas and turrets used in military vehicles which are very large and heavy requiring expensive machining, and it is the object of the invention to devise a method of forming an accurate finished surface on a rough casting without machining the casting or subjecting the casting to expensive set-up or handling procedures.

The invention will readily be understood when viewed with regard to the following description and accompanying drawings wherein:

FIG. 1 is a cross-section elevational view of a section of a cupola during the molding of a liner for a vision block opening.

FIG. 2 is a cross-sectional elevation of a cupola casting after the forming of the liner and with the vision block locked in position.

Although the concept of the invention is not limited to any single application, the invention will be disclosed as used to provide an accurate opening for vision block installation in armored cupolas or turrets wherein use of the invention is especially advantageous.

As seen in FIG. 1 the steel cupola or turret casting is disclosed at 10 and is provided with a cast hole or opening 12 formed in the surface thereof. The hole 12 is formed with a concave annular groove 14 whose purpose will later be explained.

When it is desired to finish the hole or opening 12, a core 16 is placed within hole as shown in FIG. 1. The core 16 is preferably made of steel or other metal so as to provide a smooth finish within small tolerances. Core 16 may consist of a pair of mating wedge-like members 18 and 20, which when fitted together, form the shape and cross-section of the desired opening. The parting line between members 18 and 20 appears at 22.

A lower plate 24 is attached to member 18 by screws 26 and is large enough to overlap the lower area of hole 12. A portion of plate 24 is countersunk as at 28 and provided with several holes 30 to accommodate the fastening means as explained later.

An upper mold plate 32 overlaps the upper portions of hole 12 and is provided with a beveling wing 34, and a recess 36 is formed on the lower periphery of plate 32. The plate 32, members 18 and 20, and plate 24 are drilled as to permit bolts 38 and nuts 40 to hold the entire core assembly together.

Before the core is assembled, the bezel 42 is placed in recess 36, and gaskets 44 and 46 are placed under plates 24 and 32, respectively. Once the nuts 40 are tightened, the core assembly will be rigidly held together as an integral unit. The core 16 is held in proper position within opening 12 by bolts 48 which extend through the countersunk portion 28 of plate 24 and screw into holes 50 which are drilled and tapped in casting 10. A spacer bar 52 is placed between a portion of plate 24 and gasket 44 to obtain the proper spacing of the core 16.

Once the core 16 is thus located, the opening liner may be molded. The molding process comprises the step of filling the void between core 16 and casting 10 with a material which will harden and permit removal of core 16, such that a smooth, accurate opening will result. In the disclosed embodiment the liner is composed of a thermoplastic resin composition, preferably a plastic which uses either a fiberglass, calcium silicate or tabular alumina filler which has the characteristics of low cost, cold setting, resistant to penetration and compression, good bonding strength, small degree of shrinkage or expansion, and high and low temperature stability.

The molten plastic is poured into the void between core 16 and casting 10 through a hole (not shown) in upper plate 32 until the void is entirely filled as seen in FIG. 1. It will be noted that gasket 44 defines the lower liner surface, and plate 32 and wing 34 will shape the upper liner surface.

As the plastic liner 54 hardens, an effective bonding will take place with the walls of hole 12, and the groove 14 will give extra resistance to shear forces applied to liner 54. After the plastic has "set," the core 16 may be removed by unscrewing bolts 48 and nuts 40, withdrawing bolts 38, removing plates 24 and 32 and lifting out wedge member 20. After the core 16 has been removed, the bezel 42 will remain in position as it has become embedded in the plastic.

The casting 10 now has a plastic lined opening of accurate dimensions and smooth surface which provide adequate support for a vision block.

The installed vision block 56 is shown in FIG. 2 and consists of a thick glass block of non-parallel sides formed of laminations of safety plate glass. To install block 56, a waterproofing gasket 58 is placed under bezel 42 and block 56 is inserted in the lined opening until engagement with gasket 58 is accomplished. A wedge 60 is then inserted under block 56 and tightly drawn in by threaded bolts 62 which are screwed into holes 50. Once wedge 60 is in place, the vision block 56 will be tightly fixed in position, such that a direct hit by a projectile will not dislodge the block.

As a vision block must closely fit the supporting opening to be effective, it was previously necessary to machine hole 12 to obtain the required accuracy. The machining operation is very expensive and time consuming especially so because of the size of the cupola or turret casting. The use of a plastic liner to obtain the desired accuracy and finish is much cheaper and faster, yet provides adequate strength. The resilient character of the plastic liner helps to absorb shocks and thus provides an efficient base for the vision block which may be subjected to the direct impact of a projectile.

It will be understood that various modifications to the disclosed embodiment may be apparent to those skilled in the art without departing from the spirit and scope of the invention.

What is claimed is:

1. A metal casting having a first and second side, said casting having an opening therein which extends from the first to the second side of said casting, a plastic molding lining the walls of said opening and having a smooth opening therein, a vision block extending from the first side of the casting to the second side of said casting mounted in the opening in said molding, a wedge positioned between said vision block and said molding, means connecting said wedge to said casting for drawing said wedge into the opening to secure the vision block in said molding and said casting.

2. The structure of claim 1 wherein said casting is formed with a groove therein which communicates with the opening in the casting, said molding having an integral projection which is seated in the groove, means cooperating with said molding to contact one end of said vision block to position said vision block in said molding.

3. The structure defined in claim 2 wherein said molding provides a smooth walled opening for said block, a bezel secured in said molding to position said glass block in the molding.

4. A casting, said casting having an opening which extends through one portion of said casting, a resilient plastic molding lining the opening in said casting, said molding being bonded to the walls in the casting which form the opening, a glass block having a tapered side mounted in said opening, said block being as thick as said one portion of said casting, a tapered wedge positioned between said block and said molding and contacting said tapered side of said block, said wedge having an offset head spaced from said casting, threaded means connecting said head and said casting for moving said wedge to secure said block in said opening.

References Cited in the file of this patent
UNITED STATES PATENTS

| | | |
|---|---|---|
| 1,686,942 | Thielker | Oct. 9, 1928 |
| 1,761,339 | Hauser | June 3, 1930 |
| 2,377,863 | Campbell | June 12, 1945 |
| 2,606,346 | Hassell | Aug. 12, 1952 |
| 2,815,253 | Spriggs | Dec. 3, 1957 |